April 14, 1953  F. J. BARNES  2,634,780

TIRE CHAIN MECHANISM

Filed May 2, 1950

INVENTOR
Frederick J. Barnes
BY Elizabeth Newton Dew
ATTORNEY

Patented Apr. 14, 1953

2,634,780

UNITED STATES PATENT OFFICE 2,634,780

TIRE CHAIN MECHANISM

Frederick J. Barnes, Richmond, Va.

Application May 2, 1950, Serial No. 159,441

14 Claims. (Cl. 152—237)

This invention relates to a tire chain mechanism or a traction device applicable to the tires of automotive vehicles.

It is an object of the invention to provide a traction or anti-skid device which can be readily attached to and detached from a tire, which is quickly and easily adjustable to different sizes of tires and which, when attached, is positively held on and about the tire and readily detachable therefrom when desired.

Another object is to provide a tire chain mechanism which is self-contained, can be applied without tools, is always held tight upon the wheels and can be applied by an operator without removing his gloves or mittens.

Prior to my invention, the application of anti-skid chains to the tires of automotive vehicles has been a slow, tedious and disagreeable operation, often requiring an operator to jack up the wheels of his vehicle and to get down upon wet or icy ground in order to properly apply and adjust the chains. As a result many operators often take unnecessary risks under dangerous conditions of driving by operating without chains. Furthermore, when an automotive vehicle becomes mired or otherwise immobile as by reason of ice or snow, it is often virtually impossible to apply chains or other anti-skid devices of the prior art so that it is frequently necessary for the operator to have his vehicle towed or pushed before he can proceed.

Because my invention is almost instantaneously and positively adjustable to the correct size for the tire to which it is to be applied, easily applied to a tire even under adverse conditions, and positively clamped and held to the tire until released, motor vehicle operators will apply the chains of my invention whenever conditions require. Safer driving is thereby promoted, and accidents and unnecessary towing, and service charges are avoided.

Other objects and advantages will be apparent after a study of the following description in connection with the accompanying drawings.

Figures 3, 6:
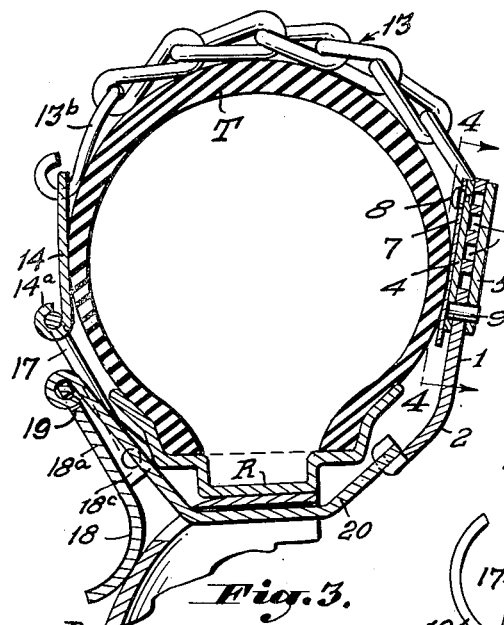
Figure 3 is a cross sectional view taken in the radial plane identified by the line 3—3, Figure 1.
Figure 6 is a detail cross sectional view on the line 6—6 of Figure 2.
Figures 4, 5:
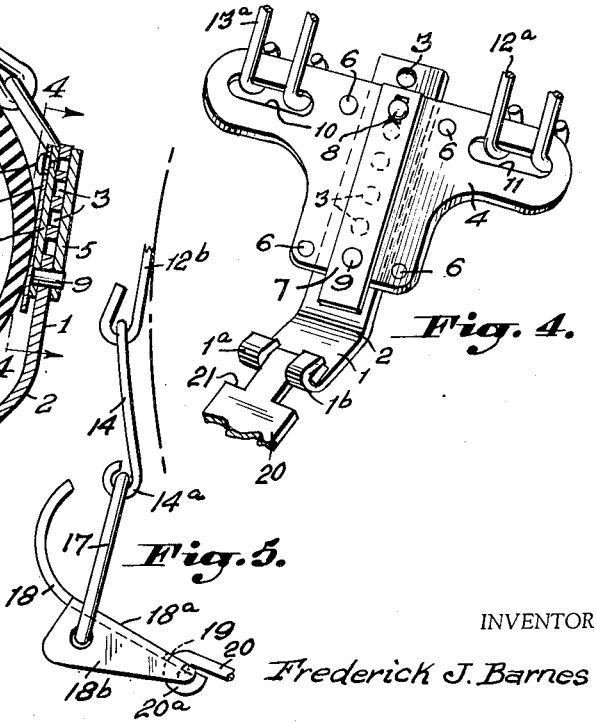
Figure 4 is a detail perspective view of the separable hook and tire-size adjustment features of my invention as they appear from the inner side.
Figure 5 is a detail view generally corresponding to Figure 3 but showing the clasp in open position.

Referring in detail to the drawings, 1 identifies a hook member or slide comprising a metal strap of uniform width and thickness and bent at an obtuse angle between its ends, as indicated at 2, Figures 3 and 4. The shorter portion of member 1 is slotted inwardly from the end thereof to form two parts which are bent to complete spaced aligned open hooks 1a and 1b. The other or longer portion of hook member 1 has a series of longitudinally aligned holes 3 all of which are of the same size and which extend in a row from the free end thereof. The number of holes, shown as five in the model illustrated, will depend upon the number of different sizes of tires which any given model is adapted to fit, there being one hole for each different tire size or diameter.

The longer or apertured portion of hook member 1 slidably fits a passageway formed by and between the shank portion of a generally T-shaped plate 4 and a shallow channel member 5 rigidly secured to one side of the plate as by welding, riveting or peening as indicated at 6, Figure 6. A leaf spring 7 having a little greater length than the corresponding dimension of the shank portion of plate 4 is secured at its one end to the plate, by means of a rivet 8. As shown upon Figure 6, this rivet has two portions of different diameters to form a shoulder 8a therebetween. The axial dimension of the portion of larger diameter is a little greater than the thickness of the spring, so that the spring may slide and turn on the rivet as a pivot. The aperture in the spring through which the rivet passes is elongated in the direction longitudinal of the spring so that the latter has a limited sliding movement in this direction. The other end of spring 7 has a pin 9 fixed thereto and adapted to pass through aligned holes in plate 4 and channel member 5, and any one of the series of holes in hook member 1. The pin 9 has a loose fit in all of the holes so that it may be easily withdrawn from all of them by flexing the spring upwardly at this end about the rivet 8 as a center. Because of the fact that the spring may slide relatively to rivet 8, the pin 9 does not bind within the holes and may be easily and freely withdrawn therefrom by a pull on the adjacent protruding end of the spring. Also, the sliding feature of the spring makes certain that a pull or tension on member 1 will be taken only by plate 4 and channel member 5. No tension is taken by the spring itself.

By this construction, the free end of spring 7 may be lifted until pin 9 is clear of all the holes, whereupon hook member 1 may be slid through channel 5 until any selected hole of member 1 is aligned with the aligned holes in plate 4 and element 5. The pin 9 is then easily guided into and through the aligned holes and is releasably held in this position by the resiliency of the spring. The member 1 and plate 4 which, when connected, conjointly comprise a bar adjustable in effective length are thus firmly locked in adjusted relation which relation, of course, will depend upon the size of tire to which the chain is to be applied. Furthermore, as will be noted from Figure 3, when the chain is in position about the tire, the tire itself acts positively to prevent withdrawal of pin 9.

Figure 2:
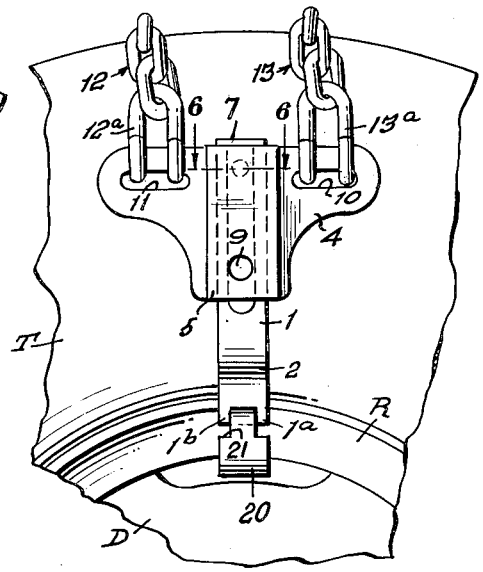
Figure 2 is a view corresponding to Figure 1 showing the chain as it appears from the inner side of the wheel, the clasp also being closed.

The plate 4 has slots 10 and 11 formed in its respective arms as clearly shown upon Figures 2 and 4. An end link 12a of a chain section 12 has its ends passing through slot 11 and bent about the contiguous portion of plate 4 to be non-detachably connected therewith. Likewise, the end link 13a of chain section 13 is connected with plate 4 through slot 11. If desired, two holes in plate 4 may be substituted for each of the slots.

The chain sections 12 and 13, when the invention is in position about a tire, pass over the tread thereof and at their other ends are attached in a like manner, by end links 12b and 13b with a T-shaped plate 14 which may be generally similar to plate 4 in size and shape. Connection is made with links 12b and 13b by means of slots 15 and 16, in the same manner as with links 12a and 13a.

The end of the longitudinal or main section of plate 14 is turned outwardly to form a loop 14a about the bight portion of a U-shaped link 17 whereby the two are permanently connected for pivotal movement about the aforesaid bight portion. The sides of the link 17 are turned inwardly toward each other at their ends to form pivot bearings passing through aligned apertures in the respective side walls of a clasp or clamp element 18. This clasp is formed from a single piece of sheet metal of the same thickness as plates 4 and 14, that is to say, about 10 gage, and comprises a body portion 18a and wing or side walls 18b and 18c, previously mentioned. These side walls are alike and generally triangular in shape, as shown in Figure 5. The end of body portion 18a, between the side walls, has a transverse slot 19, while the other end is bent into a curve of substantial radius adapted, when the chain is clamped in position about a tire, to engage the disk D of the wheel. The plate 14, link 17 and clasp 18 thus conjointly form a self-locking clamp means or tightening latch, manually operable to shorten the effective length of the device and thereby tighten the same about a tire and its rim.

Figure 1:
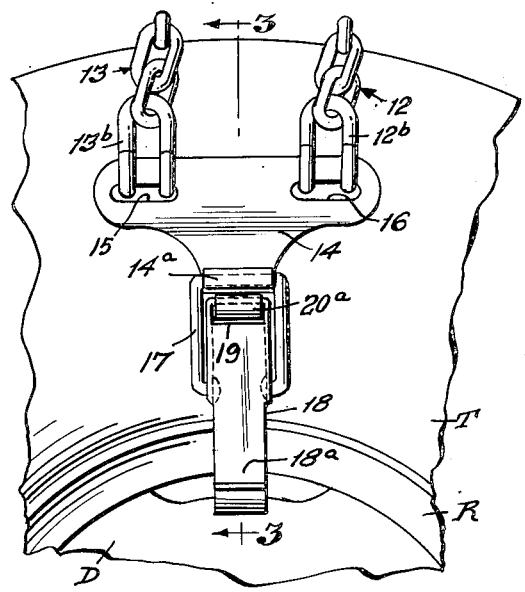
Figure 1 is an elevational view of the invention applied to a tire as it appears from the outer side of the wheel and with the clasp closed.

A connector bar 20 comprises a strip of sheet metal of the same or a little heavier gage than plates 4 and 14 and has one end passing through slot 19 and bent into loop form as indicated at 20a, Figures 1 and 5, to form a pivotal connection between itself and clasp 18. The other end of the bar 20 is notched at opposite sides as indicated at 21, Figure 4, to form lateral lugs or projections adapted to seat in the hooks 1a and 1b of member 1 and form therewith a separable connection. It will be understood that the hooks 1a and 1b are open so that the lugs of bar 20 can be easily disconnected therefrom when the device is not clamped about a tire. As clearly shown at Figure 3, the connector bar 20 is bent twice at spaced points along its length to conform generally to the cross-sectional shape of the wheel rim R.

In using the invention, the free end of spring 7 is lifted until pin 9 is completely withdrawn from the holes in channel member 5 and plate or terminal member 4. Hook member or bar 1 is then slid within the channel until the hole therein, corresponding to the size of tire with which the device is to be used, is aligned with the holes in plate 4 and channel 5. The spring is then released. Since pin 9 has a relatively loose fit within its holes and since spring 7 is longitudinally slidable a limited distance relatively to plate 4, the foregoing operation is simply and easily effected. The device, with bars 1 and 20 disconnected is now applied about the tire by inserting bar 20 through one of the slots conventionally provided at circumferentially-spaced points between the disc D and rim R, and, with clasp 18 in the open position as shown upon Figure 5, the chain or traction sections are placed over and across the tire tread and bars 1 and 20 are coupled as shown at Figure 4. Clasp 18 is then swung downwardly from the position of Figure 5 to that of Figure 3, until it abuts disc D, as shown in the latter figure. This motion draws the adjacent ends of connector bar 20 and plate 14 together and takes up the slack in chain sections 12 and 13 so that they firmly grip the tire tread. From Figure 3 it will be noted that, when the device is in clamped position, the pivot axis between clasp 18 and bar 20 lies outside the plane of link 17 or, rather the plane determined by the two pivot axes (1) between plate 14 and link 17 and (2) between link 17 and clasp 18. As a result, the tension in link 17 tends to swing clasp 18 counterclockwise, as viewed in Figure 3, about the axis of its pivotal connection with bar 20. The clasp is thus firmly and securely held in locking or clamping position until manually released by a pull restoring it to the position of Figure 5. Removal is then effected simply by separating bars 1 and 20 at hooks 1a and 1b and pulling the device off the tire. From Figure 3 it is noted that, when the device is clamped to the tire, spring 7 is pressed between the tire and plate 4, and withdrawal of pin 9 is prevented. Due to the fact that spring 7 has limited longitudinal sliding, all tension is taken by plate 4 and channel 5. No tension is applied to the spring and only shearing forces appear in pin 9. Since bar 20 is a simple rigid element, while bar 1 and the plate 4 are also unitarily related when pin 9 is in position, hooking of bars 1 and 20 together is a simple and easy procedure. If desired, member 1 may be supplied with numerals adjacent the respective holes 3 therein showing the tire size corresponding to each hole.

I have therefore provided a traction device of great utility, particularly in connection with the tires of automotive vehicles. Adjustment to the correct tire size is almost instantaneous and application to the tire is rapid and requires no tools. When clamped in position, the tension in the device itself acts to positively hold it in clamped position. Since the chain sections are under considerable tension, they grip the tire tread firmly and cause no excess wear such as is common with loosely-fitting prior art devices.

While I have shown the preferred form of my invention as it is now known to me, various modifications of shape, size and relations of parts and substitutions of equivalents will occur to those skilled in the art after a study of the foregoing specification. Hence the foregoing disclosure should be taken in an illustrative rather than a limiting sense and it is my desire and intention to reserve all modifications falling within the scope of the subjoined claims.

Having now fully disclosed my invention, what I claim and desire to secure by Letters Patent is:

1. In an attachment for vehicle tires, a flexible traction element adapted to extend over and across the tread of a tire, a plate connected with one end of said element, means carried by said plate to form a guideway, there being a hole in said plate opening into said guideway, a slide mounted for longitudinal translation only in and along said guideway, there being a plurality of longitudinally-spaced holes in said slide, each hole being adapted to register in succession with the hole in said plate in response to translation of said slide along said guideway, a pin, spring means carried by said plate and urging said pin into the hole in said plate and the registering hole in said slide, and means including a detachable connection and a tightening latch for connecting said plate with the other end of said traction element.

2. In an attachment for vehicle tires, a flexible traction element adapted to extend over and across the tread of a tire, a plate connected with one end of said traction element, a channel member rigidly attached to a first side of said plate and forming therewith a guide passageway, there being aligned apertures in said plate and channel member, a bar slidably fitting said passageway for adjustment therealong in one direction, there being a series of apertures in said bar adapted to successively align with the apertures in said plate and channel member, in response to translation of said bar in and along said passageway, a leaf spring, detent means attached to one end of said spring and adapted to enter aligned apertures in said plate, bar and channel member, and means attaching the other end of said spring to the second side of said plate for sliding movement in said one direction.

3. In a traction attachment for tires, a plate, a U-shaped link having its bight portion pivoted to said plate for pivotal movement about a first axis generally parallel with said plate, a first bar, a clasp having a body portion and side flanges extending at 90° therefrom, means connecting adjacent ends of said body portion and one end of said first bar for pivotal movement about a second axis, means pivotally connecting the ends of said link to said side flanges for pivotal movement about a third axis offset from said body portion, all said axes being parallel, whereby pivotal movement of said clasp about said second axis moves said third axis from one side of said bar to the other side thereof and varies the separation between said first and second axes, and means including flexible tire tread engaging elements connecting said plate with the other end of said bar.

4. The attachment recited in claim 3, said last-named means including a second plate connected with said tire tread engaging elements, guide means carried by said second plate, a second bar longitudinally slidable in and along said guide means, means carried by said second plate and engageable with one end of said second bar to releasably secure said second bar in adjusted position along said guide means, and a separable hook connection between the other ends of said first and second bars.

5. The attachment recited in claim 4, said releasable connection comprising a series of longitudinally spaced recesses in said second bar, a recess in said plate, latch means movable to engage the recess in said plate and any selected one of the recesses in said second bar, and spring means urging said latch means into said recesses.

6. In a traction device for the wheel of an automotive vehicle having a rim and a tire mounted thereon, chain means adapted to extend over and across the tread of the tire, a first rigid one-piece bar adapted to extend over and across the rim of the wheel and conforming generally to the shape thereof, means comprising a second bar adjustable in effective length and connected at its one end with a contiguous end of said chain means, a separable hook connection between contiguous ends of said first and second bars and self-locking clamp means connecting the remaining ends of said chain means and first bar, said clamp means being manually operable to shorten said device a predetermined amount and thereby tighten said device about the tire and rim.

7. A traction device as in claim 6, said self-locking clamp comprising a U-shaped link having its bight portion pivoted to one end of said chain means for pivotal movement about a first axis, a clasp having a body portion and side flanges, means connecting adjacent ends of said body portion and bar for pivotal movement about a second axis, means pivotally connecting the ends of said link to respective ones of said side flanges for pivotal movement about a third axis offset from said body portion, all said axes being parallel, whereby pivotal movement of said clasp about said second axis moves said third axis from one side of said bar to the other to simultaneously bring said first and second axes together to effect a shortening of said traction device and self-locking of said clamp about a tire.

8. In a non-skid attachment for a pneumatic tire mounted upon a rim, first and second plates, a non-skid element to extend over and across the tread of the tire, and connected at its ends to said plates, respectively, at opposite sides of the tire, a clasp element, a link pivoted at one end to said first plate and at its other end to said clasp element, a single rigid bar shaped to extend transversely across the rim and pivoted at one end to said clasp element, an elongated hook member separably connected at one end with a contiguous end of said bar, and means releasably securing the other end of said hook member to said second plate in any one of a plurality of selected positions spaced longitudinally of said hook member, whereby said attachment may be fitted to and about tires of different diametral sizes, said hook member and second plate when secured together conjointly forming a second bar adjustable in effective length.

9. A non-skid attachment for a vehicle tire comprising, first and second generally planar plate members, an elongated flexible tire-tread-engaging element secured to and connecting said plate members, a clasp, a link connected at one end to said first plate member for pivotal movement about a first axis parallel with said first member and at its other end to said clasp for pivotal movement about a second axis, a one-piece rigid bar shaped to fit generally about the rim of a wheel on which the tire is mounted and connected at one end with said clasp for pivotal movement about a third axis, all said axes being in parallel relation, whereby pivoting of said clasp varies the separation of said first and third axes to tighten said attachment about the tire and rim, a hook member separably connected at one end with the other end of said bar, and means releasably connecting said second plate member with said bar at any selected one of a plurality of longitudinally spaced points therealong, to adapt said attachment for tires of different diameters, said hook member and second plate member, when connected, forming a rigid unitary bar.

10. In a traction attachment for vehicle tires, first and second terminal members, tread chain means connected at its ends with said first and second members, respectively, a clasp element having a body portion and parallel laterally spaced side flanges, a U-shaped link having its bight portion pivoted to said first terminal member for movement about a first axis and the ends of its sides pivoted in said side flanges, respectively, for movement about a second axis, a bar shaped to extend over and across the rim of the wheel and pivoted at one end to said clasp for pivotal movement relatively thereto about a third axis, all said axes being parallel, whereby, on pivotal movement of said clasp, said second axis moves from one side of said bar to the other, a connection having an adjustable effective length between said bar and second terminal member, and separable hook means between the contiguous terminal portions of said bar and connection.

11. In a traction device for tires, a plate adapted to contact the side wall of a tire, link means connected at one end to said plate for pivotal movement about a first axis, a bar adapted to extend about and across the rim of the tire, a clasp having a body portion connected with one end of said bar for pivotal movement about a second axis, said clasp having side flanges connected to the other end of said link for pivotal movement about a third axis, all said axes being parallel, whereby pivotal movement of said clamp varies the separation of said first and second axes, and connecting means between said plate and the other end of said bar, said connecting means being adjustable in effective length to adapt said device to tires of different diameters.

12. In a traction device for the wheel of an automotive vehicle having a rim and a tire mounted thereon, chain means adapted to extend over and across the tread of the tire, a first rigid one-piece bar adapted to extend over and across the rim of the wheel and conforming generally to the shape thereof, means comprising a second bar adjustable in effective length and connecting one end of said chain means with a corresponding end of said first bar, a separable hook connection between contiguous ends of said bars, and self-locking clamp means connecting the remaining ends of said chain and first bar, said clamp means being manually operable to shorten said device a predetermined amount and thereby tighten said device about the tire and rim, said second bar comprising a channel member having a hole opening into the channel thereof, a pin slidably engaging said hole, spring means carried by said channel member and yieldingly urging said pin into the hole, a bar element fitting and longitudinally slidably adjustable in and along said channel member, there being a plurality of holes in said bar element adapted to sequentially align with the hole in said channel member in response to adjustment of said bar element therealong, said pin entering a selected hole in response to urge of said spring.

13. A traction device as in claim 12, said spring being a leaf spring having said pin fixed at one end thereof, and means connecting the other end of said spring with said channel member for limited sliding movement parallel with the direction of sliding of said bar element.

14. In a quickly attachable and detachable traction device for a vehicle tire mounted upon a rim, first and second plates adapted to be positioned at opposite sides respectively, of the tire, a plurality of chains each connected at its ends with respective plates, a rigid one-piece first bar shaped to fit transversely across and about the rim, a rigid one-piece hook member, a quickly-separable hook connection between one end of said first bar and the contiguous end of said hook member, means carried by said first plate to releasably fix the other end of said hook member in a plurality of positions of adjustment therealong, and clasp means connecting the other end of said first bar with said second plate, said clasp means being operable to draw the contiguous end of said bar and said plate together and hold said device about the tire and rim, said hook member and first plate when interconnected, forming a rigid unitary second bar.

FREDERICK J. BARNES.

References Cited in the file of this patent

UNITED STATES PATENTS

| Number | Name | Date |
|---|---|---|
| 1,312,924 | Rowe | Aug. 12, 1919 |
| 1,928,474 | Bambenek | Sept. 26, 1933 |
| 2,069,979 | Stahl | Feb. 9, 1937 |
| 2,286,011 | Ridgway | June 9, 1942 |
| 2,315,060 | Kane | Mar. 30, 1943 |
| 2,457,208 | Carpenter | Dec. 28, 1948 |
| 2,501,784 | Morgan | Mar. 28, 1950 |
| 2,577,142 | McGuinness | Dec. 4, 1951 |